(12) United States Patent
Hurt et al.

(10) Patent No.: US 7,050,989 B1
(45) Date of Patent: May 23, 2006

(54) ELECTRONIC COMMERCE PERSONALIZED CONTENT DELIVERY SYSTEM AND METHOD OF OPERATION

(75) Inventors: Brett A. Hurt, Austin, TX (US); Keith Henning, Austin, TX (US)

(73) Assignee: Coremetrics, Inc., San Mateo, CA (US)

( * ) Notice: Subject to any disclaimer, the term of this patent is extended or adjusted under 35 U.S.C. 154(b) by 336 days.

(21) Appl. No.: 09/526,754

(22) Filed: Mar. 16, 2000

(51) Int. Cl.
*G06F 17/60* (2006.01)

(52) U.S. Cl. ........................................................ 705/14
(58) Field of Classification Search .................... 705/14
See application file for complete search history.

(56) References Cited

U.S. PATENT DOCUMENTS

| | | | | |
|---|---|---|---|---|
| 5,724,521 A | * | 3/1998 | Dedrick | 705/26 |
| 5,848,396 A | * | 12/1998 | Gerace | 705/10 |
| 5,884,312 A | * | 3/1999 | Dustan et al. | 707/10 |
| 5,933,811 A | * | 8/1999 | Angles et al. | 705/14 |
| 6,223,215 B1 | * | 4/2001 | Hunt et al. | 709/217 |
| 6,480,894 B1 | * | 11/2002 | Courts et al. | 709/227 |
| 6,691,232 B1 | * | 2/2004 | Wood et al. | 713/201 |
| 2001/0034792 A1 | * | 10/2001 | Swildens | 709/238 |
| 2005/0261984 A1 | * | 11/2005 | Miller et al. | 705/26 |

FOREIGN PATENT DOCUMENTS

JP          10105600 A    *    4/1998

OTHER PUBLICATIONS

Business Editors/Computer Writers, 'Beyond Software Raises the Bar on Secure Transaction Web Serving', Mar. 23, 1998, Business Wire, p. 1.*

* cited by examiner

*Primary Examiner*—Arthur Duran
(74) *Attorney, Agent, or Firm*—Toler Schaffer, LLP (57) ABSTRACT

A personalized content delivery system provides personalized content to e-commerce customers visiting client web pages. A content management server, a data aggregation server, a personalization/segmentation database and a content management interface server interconnect via a data network or the Internet/WWW. Client web pages reside upon client web servers and upon third party web servers and contain personalized content delivery code (PCDC), which is executed when a customer computer receives the web page. Upon execution of the PCDC, the customer computer sends a query across the Internet to the content management server, the query identifying the client and the customer computer identity and may include a secondary client identifier. In response to the query, the content management server identifies personalized content corresponding to the client and to the customer computer identity. The personalized content is an image, an executable file, video content, audio content, streamed media, a banner ad or other content. The personalized content address and additional information is then returned to the customer computer, which then retrieves the personalized content for presentation to the e-commerce customer.

36 Claims, 8 Drawing Sheets

ELECTRONIC COMMERCE PERSONALIZED CONTENT DELIVERY SYSTEM AND METHOD OF OPERATION

BACKGROUND

1. Technical Field

The present invention relates generally to electronic commerce across the Internet; and more particularly to the delivery of content to prospective customers via the Internet in furtherance of electronic commerce.

2. Related Art

The popularity and use of the Internet (World-Wide-Web "WWW") continues to increase dramatically with time. While electronic commerce (e-commerce) across the Internet is a relatively recent development, e-commerce sales already represent a substantial portion of overall sales. While some e-commerce sellers sell only via the Internet, other e-commerce sellers maintain conventional stores and sell over the Internet as well.

Traditional advertising and sales theories, however, do not always readily apply to e-commerce sales. Using conventional methods, advertisers create advertising content that is directed toward a particular type of potential customer and is placed in a particular medium. For example, advertisements for golf clubs are shown on television during golfing tournaments or in golfing magazines but are not broadcast at most other times. While advertisement upon the Internet has become substantial, little basis exists for targeting advertisements to particular types of potential customers or for validating the success of advertising campaigns.

Some attempts have been made to correlate the content of a particular web page being viewed by a prospective customer with advertising content presented therein. For example, a prospective customer viewing a web page listing scores of baseball games may be provided with an advertisement and link to a web site that sells athletic equipment. As a further example, a prospective customer viewing a web page providing information regarding infants may be provided with an advertisement and link to a web site that sells baby products. Unfortunately, this type of correlation is prone to errors and has produced little historical success.

Further, determining which e-commerce advertisements or promotions are successful is also difficult, if not impossible to determine. Such is the case because correlation between e-commerce advertisements and e-commerce sales cannot be easily determined. Only when a customer performs a direct click-through from an advertisement to an on-line purchase is it possible to determine that the advertisement corresponds directly to a sale. In most, if not all other advertising situations, the success of an advertising campaign is indeterminable.

E-commerce presents its own unique difficulties in attempting to close sales. The very nature of e-commerce precludes common types of techniques used to close sales. Conventional stores typically employ sales people to assist customers in selecting and purchasing products. The sales people present purchase options to customers, receive feedback from the customers and, based upon the feedback, are able to take steps to close the sale. In an e-commerce transaction, however, customers are able to view a wide range of product offerings without traveling to different physical locations. The prospective customer operates alone, without any assistance in making the decision whether to purchase a product. Thus, no representative of the seller is able to close the sale. Various studies have shown that many e-commerce shoppers select items for purchase, place them in their electronic shopping cart, and prepare to make the purchase only to change their mind at the last minute.

Thus, there is a need in the art for a system that tailors content, including advertising content, to particular groups of users in an attempt to make sales or simply to expose particular content. Further, there is a need in the art for a system that allows e-commerce vendors to take steps to close sales. Moreover, there is a need in the art for a system that provides meaningful feedback to e-commerce vendors regarding customer habits, that provides feedback regarding the success of advertisements/content and that allows e-commerce vendors to alter advertising/content based upon these results.

SUMMARY OF THE INVENTION

Thus, to overcome the shortcomings of the prior systems, among other shortcomings, a personalized content delivery system constructed according to the present invention provides personalized content to customers visiting client web pages. The personalized content delivery system includes a content management server, a data aggregation server, a personalization/segmentation database and a content management interface server. The system elements are interconnected via at least one data network and may be interconnected via the Internet/WWW. Further the content management server couples to the Internet or another data network and is accessible by customer computers.

According to the terminology of the present invention, a client operates a client web server or obtains web site space on a third party server. Typically, the client is engaged in some form of e-commerce, e.g., sales, advertising, sampling, surveying, etc. Client web pages reside upon the client web servers and/or upon third party web servers. Customers access the client web pages using customer computers. Customer computers may be desktop computers, laptop computers, Personal Data Assistants, web enable phones, Internet appliances, web enabled televisions or any other type of device which may access the client web pages. The customer computers may use browser software to display the client web pages to the customer.

Contained within each of these client web pages is personalized content delivery code (PCDC), which is executed when the customer computer receives the web page. Upon execution of the PCDC, the customer computer sends a query across the Internet to the content management server, the query identifying the client, the client's web page (e.g., web page ID, advertising campaign ID, etc.), and the customer computer. In response to the query, the content management server retrieves the Internet address of personalized content corresponding to the client, the client's web page and the customer computer. The personalized content is, generally speaking, a non-executable file or an executable file. The address of the personalized content is then returned to the customer computer, which then retrieves the personalized content for presentation to the customer. Examples of personalized content include advertisement images, surveys, articles, streamed media, Java Applets, text files and other types of content.

Because the PCDC causes the customer computer to access the content management server upon accessing each client web page access, the personalized content displayed to the customer may be tailored not only to the customer but to the customer's current web site access location as well. The system therefore may provide targeted customer advertisements that will increase sales at the client's e-commerce site.

The data aggregation server couples to the content management server and receives a data record each time that the content management server services a query. The data aggregation server collects these data records and periodically provides the data records to the personalization/segmentation database, which adds the data records to its database. Thus, the data records reveal the e-commerce shopping habits of customers while visiting the client's web site/web pages.

The content management interface server allows the client to analyze the data records contained in the personalization/segmentation database and to create segmentation rules for subsequent customer visits to the client web site/web pages. These segmentation rules are then used to create the tables that are provided to the content management server for subsequent operations. In segmenting customers, the client associates particular personalized content with each customer segment. Thus, customers that subsequently access the client web site/web pages will receive personalized content that has been uniquely assigned to a corresponding segment. Those customers that do not have a prior history receive default content until they have developed a history that may be used to tailor personalized content.

By segmenting customers, the success of advertising campaigns and other content delivery may be judged. For example, a group of customers may be divided into five segments, each of which receives a particular advertisement during subsequent visits. For the subsequent visits, shopping behavior of these five segments of customers is recorded in the personalization/segmentation database. Based upon the subsequent customer shopping behavior, the client may therefore judge the effectiveness of the various advertisements.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
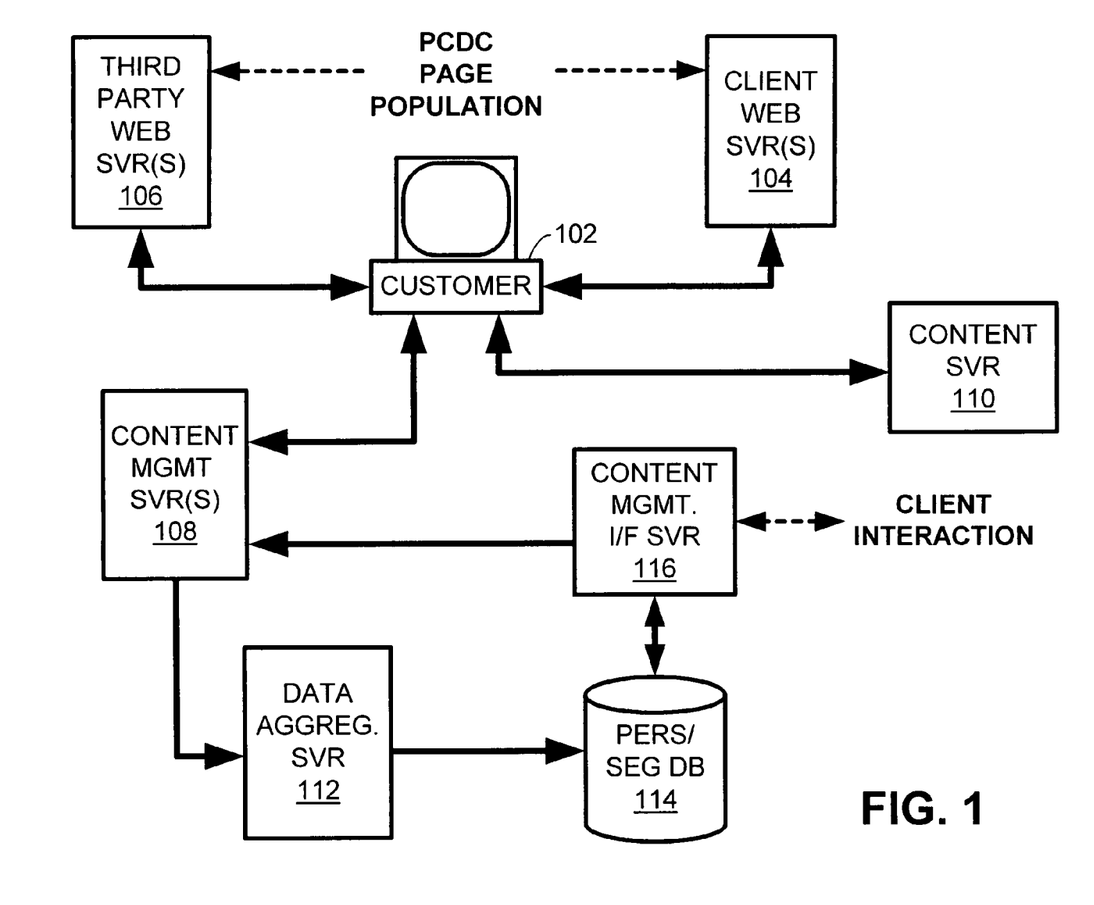
FIG. 1 is a system diagram illustrating a web based personalized content delivery system constructed according to the present invention.

FIG. 1 is a system diagram illustrating a web based personalized content delivery system constructed according to the present invention. The personalized content delivery system includes at least one content management server 108, a data aggregation server 112, a personalization/segmentation database 114 and a content management interface server 116. Personalized content delivery code (PCDC) is loaded into web pages stored on client web servers 104 and is loaded into web pages stored on third party web servers 106 that service the clients.

A client is a company or another type of entity that is engaged in commerce, including e-commerce. Clients may host on-line stores at which customers purchase goods and services. In providing their on-line stores, clients provide a number of web pages on their client web servers 104. Each web page may correspond to a particular item for sale, a particular category of items for sale, one of a plurality of pages provided during checkout, a product search page, or another page. However, clients may also be engaged in other types of businesses as well such as portals, chat rooms, application service providers, search engines, and other Internet based operations.

The client may pay to have its web pages, banners, or other content displayed on a third party web server 106. The third party web server may be a portal, a search engine, a non-competing e-commerce site, or another site at which the client desires to advertise. Because the client pays for the right to advertise on these other sites, the client typically desires to have its personalized content displayed in the web pages or banners on those sites.

Customers visit the client web servers 104 and third party web servers 106 during web surfing, e-commerce shopping or other activities upon the Internet. The customer would use a customer computer 102 to access these web servers and may run a browser program upon the customer computer 102. However, the customer may use other types of devices when accessing the client web servers 104 and third party web servers 106. These other devices may include personal data assistants, web-enabled telephones, laptop computers, net appliances, web-enabled televisions, and other electronic devices that have the ability to download web pages from web servers across a data network.

PCDC may be loaded into each web page or banner that makes up a portion of a web page. The client may take steps to load the PCDC into these web pages during setup of the web pages, or portions thereof. Because the PCDC applies equally to all customers that access the web pages, it may be easily entered into all web pages on a site. Alternately, if the client implements the system of the present invention after its e-commerce site has been built, the content management server 108 or the content management interface server 116 may be used to load the PCDC into the web pages or portions thereof.

When a customer uses a browser (or another program contained on the customer computer 102 to access a web page) that has been populated with the PCDC, the customer's browser executes the PCDC contained in the web page. In the described embodiment, the PCDC is JavaScript and/or HTML code. However, in other embodiments, the PCDC may include differing types of code. Upon execution of the PCDC, the customer computer 102 sends a query to the content management server(s) 108, in which the PCDC identifies the client, a secondary identifier that reveals additional information about the customer's access (e.g., the client's web page being accessed, an advertisement ID, a sales campaign ID, etc.) and the identity of the customer/customer computer. A cookie or other identifier contained on the customer computer 102 provides the customer/customer computer identity. The query may also include additional information relating to the interaction between the customer and the particular web page that has been populated by the PCDC.

In response to some or all of the information contained in the query, the content management server(s) performs a table lookup (or other logical operation) based upon the information contained in the query and receives the address of personalized content to be displayed to the customer or executed by the customer computer. In other embodiments, a rules application or other logic operation may be performed instead of a table lookup. The content management server 108 returns the address of the personalized content to the customer computer 102. The personalized content may include one or a combination of HTML, JavaScript, XML and other language that render in a web browser program. However, the personalized content may also be an audio file, a video file, streamed multimedia content, or other content that the client desires to deliver to the customer. In an alternate operation, the content management server 108 pushes personalized content back to the customer computer 102 in response to the query.

The customer computer 102 receives the personalized content address and processes it accordingly. When the customer computer 102 receives the address of an image, it downloads the image from the content server 110, for example, and displays the image to the customer. The personalized content may be displayed within a designated location of the web page that was downloaded from the client web server 104 or the third party web server 106. When the customer computer 102 receives the address of an executable file, the customer computer 102 retrieves the executable file and executes it for the customer. This executable file may also be downloaded from the content server 110.

After the content management server 108 sends the result to the customer computer 102, it may also send a record to the data aggregating server 112 that includes information, such as the identity of the client, the identity of the web page visited, the identity of the customer, and/or other information pertinent to the customer's web page visit. Periodically, or upon request, the data aggregation server 112 formats this information and passes the information to the personalization/segmentation database 114. This information is archived for subsequent use.

Via client interaction, and by using data contained in the personalization/segmentation database 114, the content management interface server 116 creates the tables, rules, or other logic that are later used to determine the personalized content to be provided to particular customers. By using the set of tools available on the content management interface server, the client may review pertinent customer information. This customer information may reveal the numbers of customers that have visited the client e-commerce site, how the customers came to the site, e.g., directly or via a third party web server, the manner in which the customers behaved once at the client's e-commerce site, whether the customers purchased goods from the e-commerce site, and additional customer information.

Based upon this gathered information, the client may segment the customers and select particular personalized content to be sent to each segment of customers when they next visit a particular site, web page or portion thereof. This segmentation may be on a user-by-user basis, on a group of users basis, or based on other criteria. With this segmentation established, the content management interface server generates tables, rules or other logic that the content management server(s) 108 will subsequently use to provide content to the customers.

Figure 2:
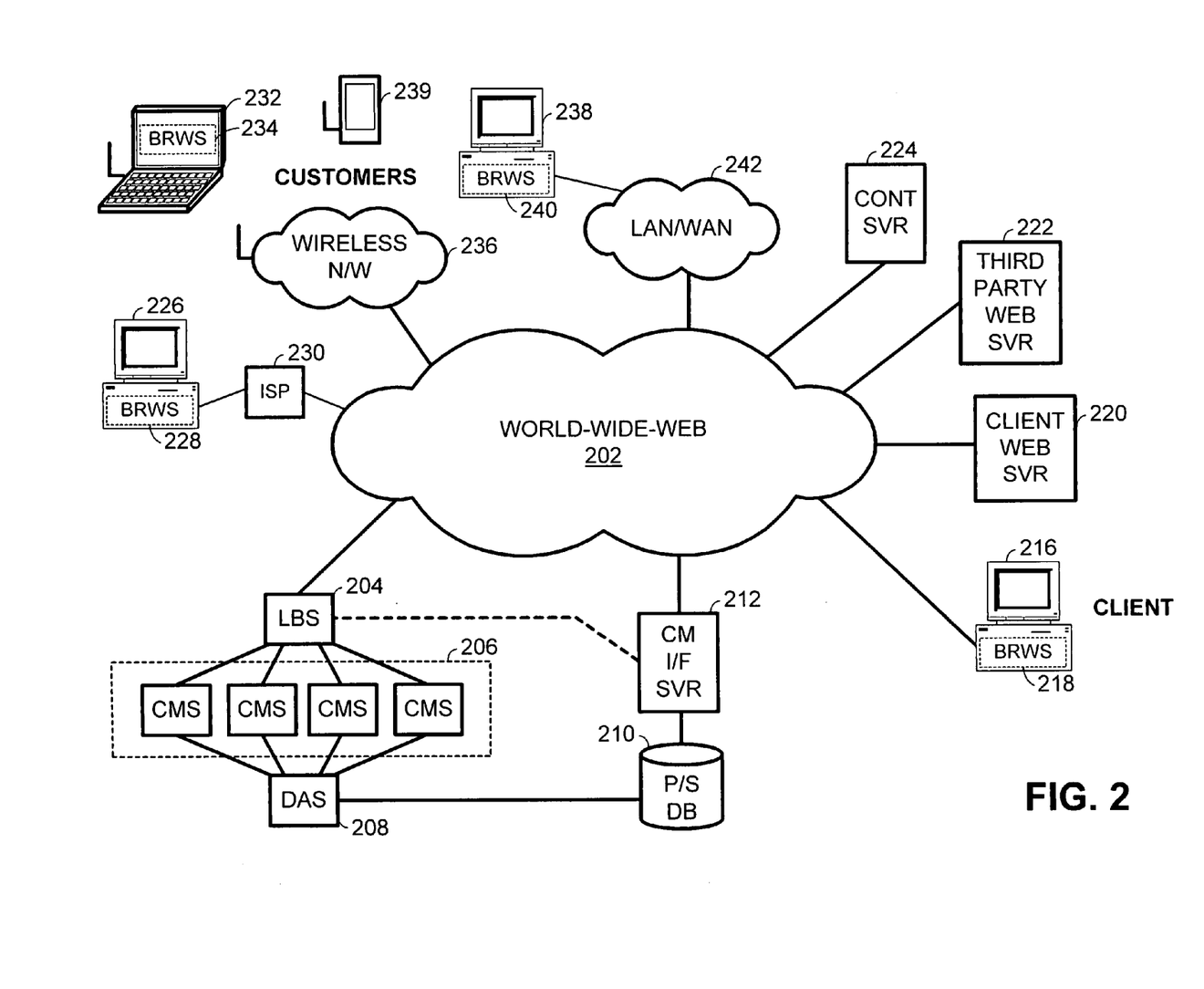
FIG. 2 is a particular embodiment of a web based personalized content delivery system constructed according to the present invention.

The illustrated architecture of the content server 110, the data aggregating server 112, the personalization/segmentation database 114 and the content management interface server 116 illustrated in FIG. 1 (and that which is illustrated in FIG. 2) are particular embodiments only. Differing architectures could be employed to perform the functions described herein within the scope of the present invention. For example, each of the servers illustrated could be implemented by a plurality of separate machines. Alternatively, each the illustrated servers could be combined so that their functions are performed by a lesser number of machines than the number of servers illustrated.

Generally speaking, personalization may be described as customizing or tailoring Banner Ads, Promotions and other Content to individual customers in an attempt to make sales to the customers. This type of personalization is very important in the highly competitive e-commerce marketplace. For example, it does not make sense to provide an advertisement providing a discount on winter clothing to a customer searching for a swimsuit. Personalization helps sellers identify individual customers visiting their sites, or potentially visiting their sites, and to tailor the seller's promotional ads or other content delivered to the customer or potential customer based on past shopping behavior in an attempt to make a sale. The personalization process therefore increases the chances of making a sale to a customer.

In one example of operation, a particular customer has previously, on three occasions, shopped at a client's e-commerce site. In these prior visits, the particular customer placed numerous items in his shopping cart, only to remove them prior to checking out. If this customer were shopping in a physical store, a sales associate would have the ability to attempt to close the sale. In the e-commerce store, however, no such physical technique exists. Thus, according to the present invention, when the customer places items in his shopping cart, the system of the present invention could provide a 10% off coupon to the customer, contingent on the customer's completed purchase of the items in his shopping cart. Thus, with the system of the present invention, the client is able to attempt to close the sale even though it does not physically contact the customer.

Segmentation is a technique for identifying a group of customers by defining the group's characteristics. For example, a segment can be defined as "all the visitors who bought at least once from their site", "people who have visited their site more than once", or "people who are first time visitors to their site". Internal content delivery means showing banner ads or personalizing ads, content, etc., within the client's website. External personalized content delivery means running clients' banner ads on third party web sites such as content sites, portals, search engines and other sites.

Another example of the use of personalization is in connection with personalized marketing to measure the success of particular advertising campaigns. For example, a segment may be defined as "visitors that have visited the customer's e-commerce site more than once". A goal of this personalization is to determine how repeat visitors react to various promotional banners, e.g., in a golf shop website. One control group and three test groups are set up to test the response. In the control group of the segment, no discount banner is served. In the first test group, a 10% off banner is served. In the second test group, a 20% banner is served. In the final test group, a $25 off banner is served. These discounts are then applied to purchases made by respective customers. For 100,000 "repeat visitors", 25,000 customers receive the control group banner, 25,000 customers receive test group 1 banner, etc.

Segmentation of the customers into the four groups allows the effect of the distribution of a selected banner ad to each segment. When a customer visits the client's corresponding web page, the system determines which segment the customer falls within by analyzing the customer's cookie or other unique customer identifier. If the customer does not fall into the defined segments, then he or she will be served with a default banner. If the customer falls into any of the segments listed, he or she will be served with a banner or other personalized content designated for the segment. All customers falling within a particular segment receive the same banner. If a customer falls into multiple segments within the personalization, a priority will be determined for content delivery. Results may then be subsequently traced for the particular segmentation and the effectiveness of each advertisement can be judged.

FIG. 2 is a particular embodiment of a web based personalized content delivery system constructed according to the present invention. In the illustrated embodiment, a plurality of content management servers 206 couple to the Internet/world-wide-web (WWW) 202 via a load-balancing server 204. For each received query, the load-balancing server 204 routes communications to a designated content management server of the plurality of content management servers 206. Each of the content management servers 206 also couples to a data aggregation server 208. The data aggregation server 208 couples to the personalization/segmentation database 210. A content management interface server 212 couples to the personalization/segmentation database 210. The content management interface server 212 also couples to the WWW 202 and may couple to the load-balancing server 204 (or content management servers 206) via another connection, e.g., LAN, WAN, etc.

Third party web server 222, client web server 220 and content server 224 also couple to the WWW 202. These servers, as well as the other servers, may be at any physical location. Customers may couple to the servers in any of a variety of manners. For example, customer computer 226 running browser 228 may couple to the WWW 202 via an Internet service provider 230. Customer computer 238 running browser 240 may couple to the WWW 202 via a Local Area Network or Wide Area Network 242. Moreover, customer computer 232 running browser 234 may couple to the WWW 202 via a wireless network 236. The customer computer may be another type of electronic device as well that can access the WWW 202 and download web pages from the third party web server 222 or the client web server 220. Thus, the customer computer could be a personal data assistant 239, an Internet enabled telephone (not shown), a web enabled television (not shown) or another Internet enabled device.

Depending upon the type of customer computer employed by the customer, the overall communication link character, connection topology and other communication link characteristics will differ. However, generally speaking, the customer computer is initially in communication with the client web server 220 or the third party web server 222 when accessing a web page. Subsequent to his web page access, the customer computer communicates with the content management server(s) 206 to send the query and in receiving the response to the query. In the architecture of FIG. 2, the customer computer communicates with the content management server(s) 206 via the load balancing server 204. However, load balancing among the content management server(s) 206 may be performed using other techniques, such as unique URLs to each content management server 206, an operation of a domain name server to identity a serving content management server, etc. Subsequent to receipt of the query, the customer computer is then in communication with a resource, e.g., the content server 110, from which the personalized content is retrieved.

In an example of operation according to the present invention, customer computer 226 accesses a web page contained on client web server 220. The downloaded web page contains executable PCDC, which upon execution generates a query to the load-balancing server 204. The query, in this example is directed to the WWW address of the load balancing server 204 and includes a path name to a particular directory and resource that is contained on a corresponding content management server 206. An example of such a query would have the address: http://expedite.coremetrics.com/clientID/cginame/clientID/exp id/type. The query will include additional information as well, such as the type of content of the site visited, the time stamp of the customer computer 226, a third party banner supplier, etc. Via interaction with a domain name server, the URL "expedite.coremetrics.com" enables routing of the query to the load-balancing server 204 (or directly to a designated content management server 206). The load-balancing server 204 receives the query, parses the query to read the first instance of "clientID" and, based upon the "clientID", the load-balancing server 204 routes the query to a particular content management server of the plurality of content management servers 206.

The particular content management server 206 then uses the query address to access a lookup table (or other data structure) corresponding to the clientID and expID (client advertising campaign, promotion identification or other subset created by the client) stored in the CGI name directory corresponding to CGIname. The CGI directory stores common gateway interface executable files, each of which corresponds to a particular client and expID. In some cases, a client will not have separate expIDs and a single CGI executable will be employed for all queries corresponding to the client. In one embodiment, the lookup table is a hash table (a structured data set for an in-memory database) and a cookieID, that uniquely identifies the customer and that is received with the query, is used as an input to the hash table. The table lookup returns the address of, pointer to, or other identification of the personalized content. The personalized content may be an image, a banner advertisement, an audio file, a video file, a multimedia stream, etc. Further, the address of the personalized content may be an Internet address, a pointer, a pointer to a pointer, or another item that may be used to retrieve the particular personalized content.

The browser 228 operating on the customer computer 226 receives the address of the personalized content, retrieves the image or executable based upon the address, and displays the image or executes the executable on the customer computer 226. Within the content returned to the customer computer is the clientID (client identification), the expID (if any), the cookieID (customer identification), the bannerID (location on the web page in which to display content, if required), the personalized content type (image or executable) and the destination URL of the image or executable. In an alternate embodiment, the content management server returns the personalized content to the customer computer 226 instead of the image/executable address.

Concurrent with returning the content to the customer computer 226, the content management server 206 may write a record of the transaction to the data aggregation server 208. A record may be created every time the content management server 206 responds to a query. Alternately, the records may be created to obtain a statistical representation of customer behavior, in which case records are not created for each query response. This record is written to a text file and includes the clientID, the expID, the cookieID, the bannerID, and the personalized content type. As was previously described, this text file will periodically be converted into database records that are stored on the personalization/segmentation database 210. In an alternate embodiment, each time a record is created by the content management server 206, a database record is created that is in a format that may be received by the personalization/segmentation database 210. The database records may be transferred to the personalization/segmentation database 210 upon their creation or they may be held by the content management server 206 and downloaded to the personalization/segmentation database 210 periodically or upon the occurrence of a triggering event.

In another operation according to the present invention, a client, using client computer 216 (and browser 218) accesses the content management interface server 212 across the WWW 202 in setting up campaigns and to review the activity of his or her customers. While the client may access the content management interface server 212 at any time to setup campaigns, e.g., segmentations and other personalized content direction, the client's continued participation is not required to keep the system current. Based upon the client's most recent input, the content management interface server 212 periodically (every one to six hours, for example), or upon a manual operation, generates updated tables to perform the personalization/segmentation operations.

Figure 3:
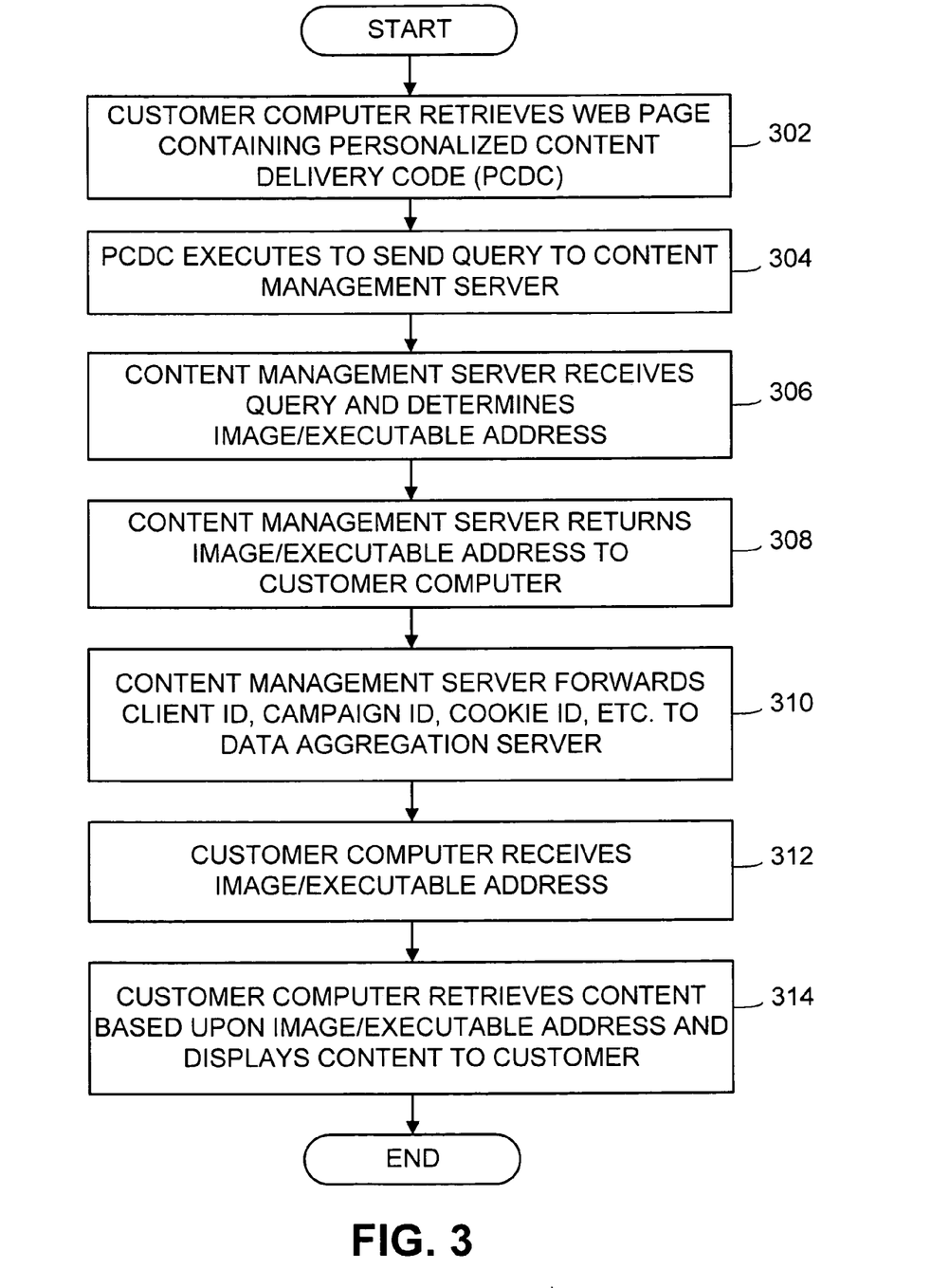
FIG. 3 is a logic diagram generally illustrating operation of a web based personalized content delivery system according to the present invention.

FIG. 3 is a logic diagram generally illustrating operation of a web based personalized content delivery system according to the present invention. Operation commences wherein a customer computer retrieves a web page that has been populated with PCDC (step 302). The PCDC is received by a browser on the customer computer and executed. Upon its execution, the PCDC causes the customer computer browser to send a query to a corresponding content management server (step 304).

The content management server receives the query, performs a table lookup (or other lookup operation) based upon the query and determines the address of personalized content (image or an executable file) that will be used for the personalization operation (step 306). In one embodiment, the database used for the lookup corresponds to a particular client and segment, e.g., campaign ID, of the client. The table lookup itself uses an index that identifies the particular customer. If the customer is not represented in the database, a default result is returned. The default result would be returned for a first time visitor to the site or to the web page.

In an alternate embodiment, characteristics of the particular customer or characteristics of the particular web page the customer is visiting are used in the table lookup. Customer characteristics may be captured by a cookie residing upon the customer computer, the cookie having been generated upon the customer's visit to the client's website. In one embodiment, the PCDC executed for present operation extracts relevant information from the cookie (or other characteristics of the customer gathered from the customer computer) and returns this information to the content management server. This information is then used in the table lookup operation. Other criteria may also be employed in selecting content to be provided to the customer, e.g., time of day, physical location of customer, type of computer the customer is using, etc.

After retrieving the address and type of content to be displayed to the user, the content management server returns the address of the personalized content to the customer computer along with an indication of the type of content and additional required information (step 308). The content management server may then forward a record of the transaction to the data aggregation server, the record including information such as the clientID, the campaign ID (expID), cookieID and/or other relevant information (step 310).

The customer computer receives the personalized content address from the content management server along with the additional content of the response (step 312). The browser operating on the customer computer then retrieves the personalized content based upon the address received from the content management server. When the personalized content is an image, the customer computer displays the image to the customer within the web page that had been previously downloaded from the client web server or third party web server (step 314). Alternately, when the personalized content is an executable file, the customer computer executes the executable file thereby displaying the content to the customer. From step 314, operation ends. The personalized content may comprise a combination of HTML, JavaScript and other language that render in a web browser program. However, the personalized content may also be an audio file, a video file, streamed multimedia content, or other content that the client desires to deliver to the customer.

Figure 4:
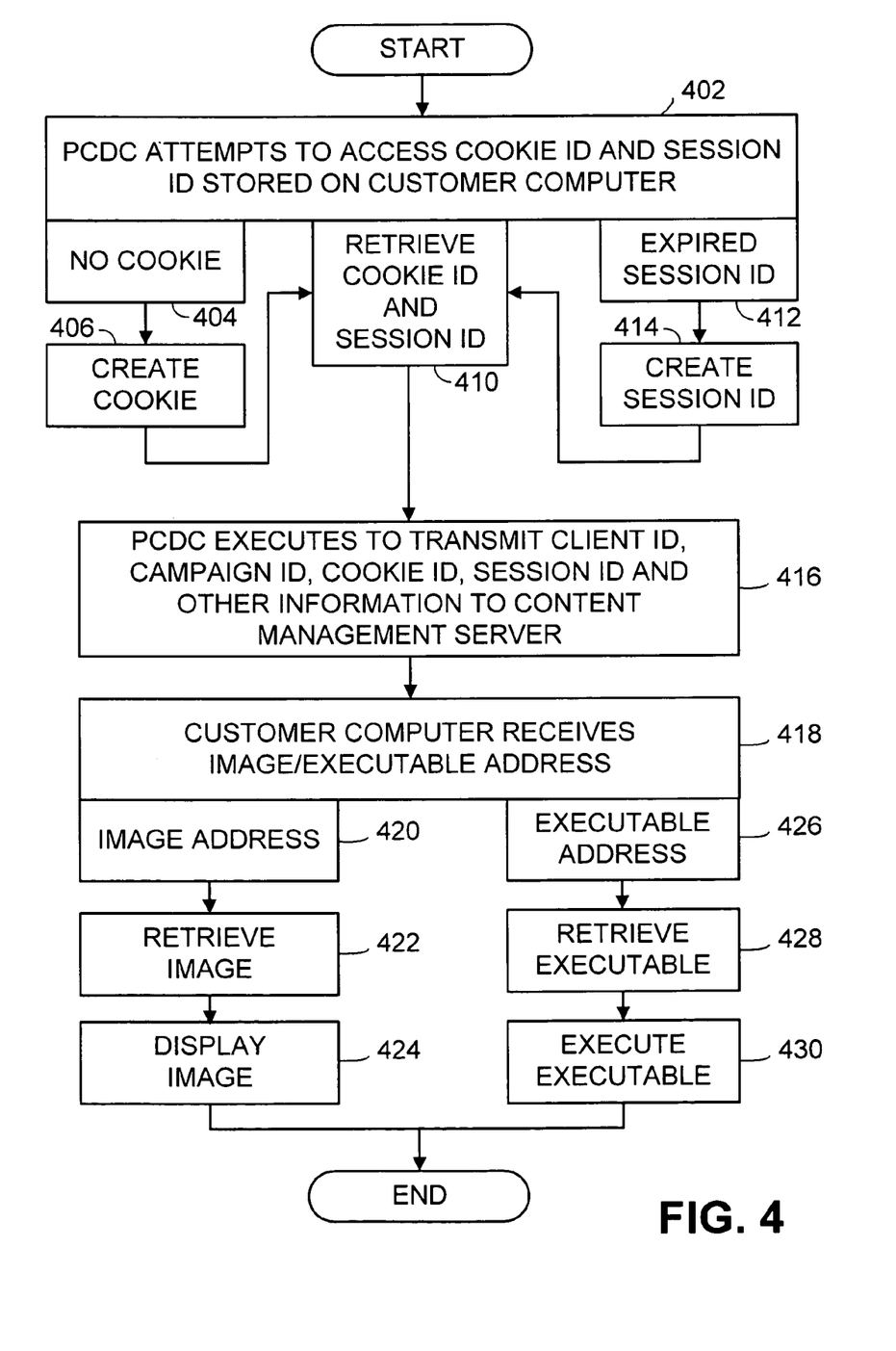
FIG. 4 is a logic diagram illustrating operation of a customer computer in seeking and obtaining personalized content according to the present invention.

FIG. 4 is a logic diagram illustrating operation of a customer computer in seeking and obtaining personalized content according to one embodiment of the present invention. Operation commences when a customer accesses a web page that contains PCDC. The PCDC executes so that the customer computer attempts to access the cookieID and sessionID that may have been previously stored in a cookie on the customer computer (step 402). If this is the first client web page that the customer has accessed, no cookie will exist for the client (step 404) and the PCDC creates a cookie (step 406). Because the customer has no unique identity with respect to the client, a cookieID must be also be obtained. In one embodiment, the content management server creates unique sequence numbers that serve as cookieIDs. These cookieIDs are then sent to the client web server for assignment to new customers. In this embodiment, the customer computer requests and receives a cookieID from the client web server as part of its query. In an alternate embodiment, the PCDC directs the customer computer to access another server computer, e.g., the content management server, to obtain a cookieID. This access may be contained in the query sent from the customer computer to the content management server.

The sessionID is a customer ID that is valid for a particular time period, e.g., twelve (12) hours, and serves to correlate events occurring during a particular session that the customer has with the client's web site. The sessionID is created by the PCDC and includes the clientID, the cookieID, the Internet Protocol (IP) address of the customer, and a time stamp. Each time that the customer accesses a web site that includes PCDC, the PCDC accesses the respective cookie to determine whether a current sessionID exists. The cookie may be valid across multiple client web sites and serve to identity a particular customer across the multiple client web sites. If the most recent sessionID is expired, or if no sessionID exists (step 412), the PCDC creates a sessionID and writes the sessionID to the cookie (step 414).

Cookies may be encrypted when sent across the Internet to and from the client computer using PK1 or another encryption type. Further, because cookies may be modified or their function limited by customers, it may be desirable to make copies of cookies and maintain the cookie copies remotely from the customer computer for future reference.

When both a cookieID and a current sessionID have been created, the PCDC retrieves the cookieID and the sessionID (step 410). Then, the PCDC executes to transmit a query to the content management server (step 416), the query including the clientID, the cookieID, the sessionID and other information that the PCDC deems to be required. If the client has more than one advertising campaign, the query may include the expID (campaignID) as well. As was previously discussed, personalized content may be chosen based upon the customer's identity (cookieID). However, in other operations, the personalized content may be selected based upon other criteria gathered by the PCDC such as customer demographics, customer computer characteristics and web page characteristics, among other criteria.

The customer computer then waits for a response from the content management server; the response including the address or other identity of an image or executable file (personalized content) that the customer computer is to display/execute (step 418). When the response includes the address of an image (step 420), the customer computer retrieves the image (step 422) and displays, streams or otherwise delivers the content to the customer (step 424). When the response includes the address of an executable (step 426), the browser on the customer computer retrieves the executable (step 428) and executes the executable (step 430) to provide the content to the customer. In providing the content to the customer on the customer computer, interim steps may be required, depending upon the type of personalized content retrieved. For example, to present streamed multimedia to the customer, a streaming multimedia player must be obtained and launched. As another example, when the personalized content is an audio or video file, an appropriate player must be obtained an launched to enable presentation of the personalized content to the customer. From both steps 424 and 430, operation ends.

Figure 5:
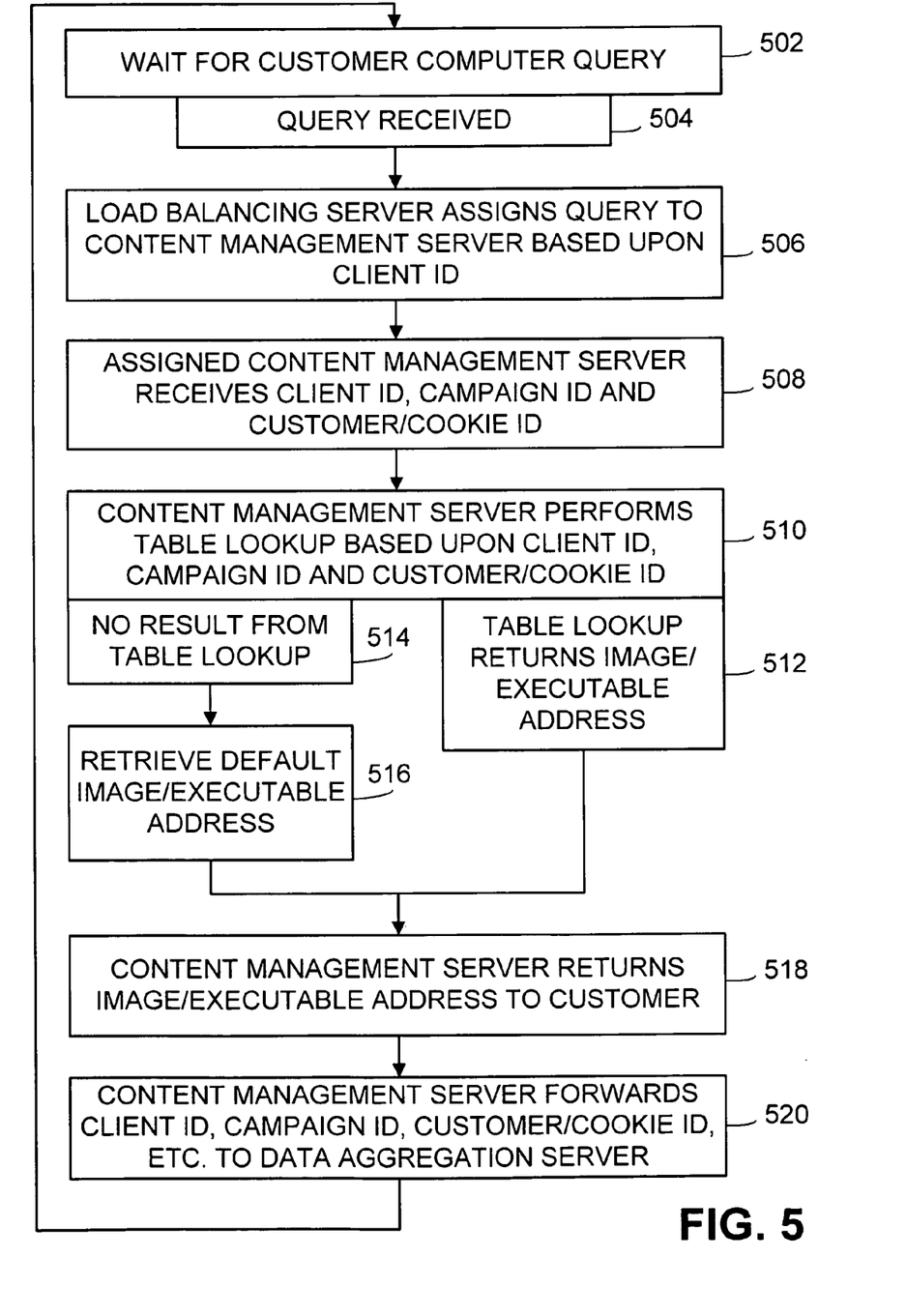
FIG. 5 is a logic diagram illustrating operation of a load balancing server and a content management server according to the present invention.

FIG. 5 is a logic diagram illustrating operation of a load balancing server and a content management server, both according to the present invention. As a first described operation, the content management server waits for a query from a customer computer (step 502). Upon receipt of a query from a customer computer (step 504), the load balancing server assigns the query to a content management server based upon the clientID (step 506). In a typical installation, one content management servers may service a plurality of clients. However, for heavier traffic installations, one or more content management server may be required to service a single client. When multiple content management servers service a single client, the load balancing server uses reference to the expID (campaignID) in selecting a content management server. When the load balancing server is not employed, step 506 is not performed.

The content management server then performs a table lookup (or other lookup operation) based upon the clientID, expID, cookieID. In the described embodiment, a single hash table is created for each clientID/expID pair and the cookieID serves as the lookup index for the hashing function. When hashing the cookieID does not yield a result from the table lookup operation (step 514), the content management server retrieves a default address for an image or for an executable file (step 516). Otherwise, the table lookup operation returns the address of an image or executable file (step 512).

The content management server then returns the address of the image or executable to the customer computer along with additional information (step 518). In an alternate embodiment, the content management server returns the image or executable file to the customer computer. Once this operation is complete, the content management server forwards the clientID, the expID, the cookieID and additional required data to the data aggregation server for further processing (step 520). From step 520, operation returns to step 502.

Figure 6:
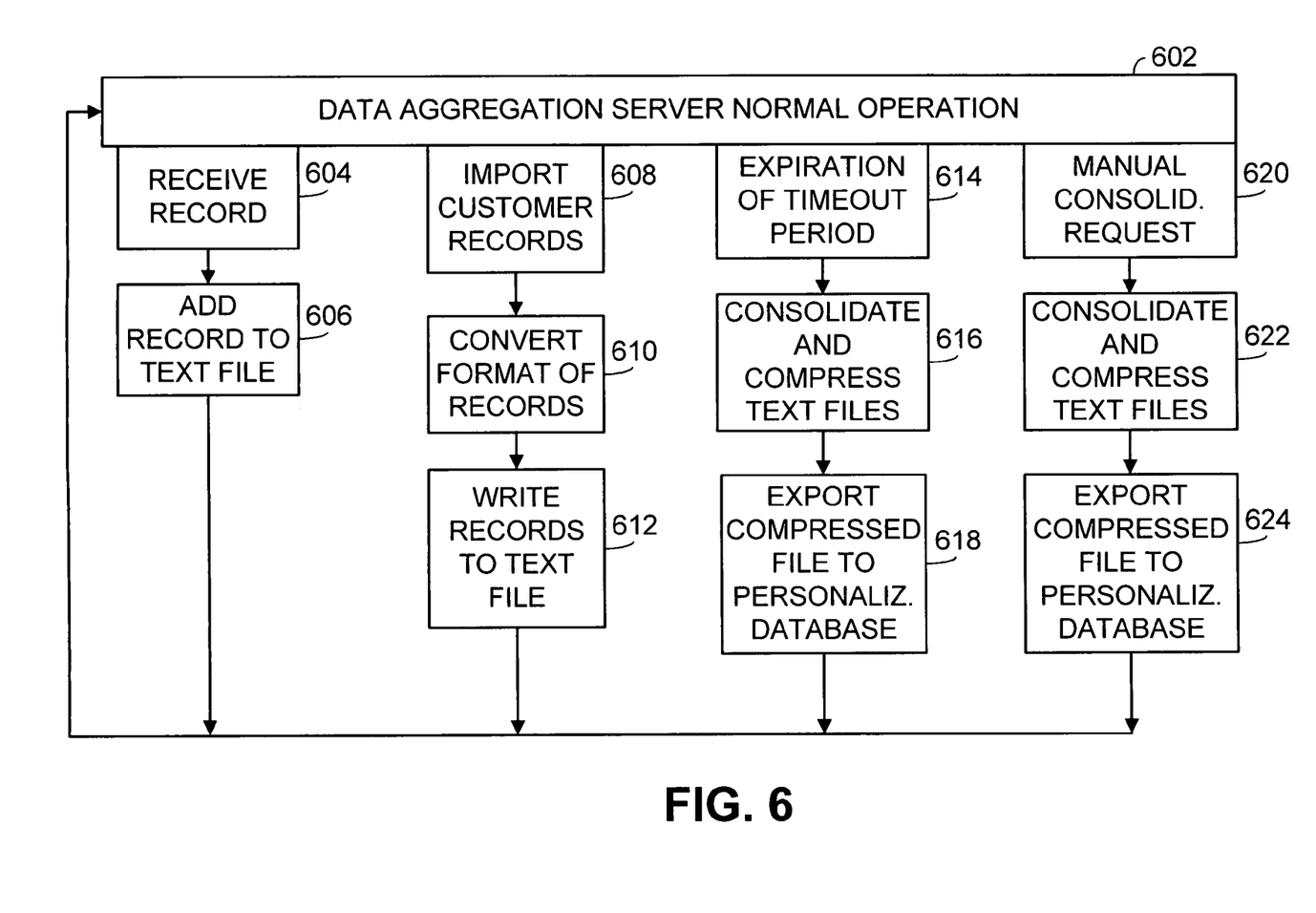
FIG. 6 is a logic diagram illustrating operation of a data aggregation server according to the present invention.

FIG. 6 is a logic diagram illustrating operation of a data aggregation server according to the present invention. From the normal operating state of the data aggregation server (step 602), various operations may take place, some of which are described with reference to FIG. 6. As a first operation, the data aggregation server receives a record from a content management server (step 606). Upon receipt of the record, the data aggregation server adds the record to a text file that either contains, or will contain other records received from the same content manager server or other content management servers.

In another operation, the data aggregation server imports customer records that are of another format (608). The client at its web site may have collected these customer records over time. Upon commencing operation with the system of the present invention, the client desires to retain these records and thus imports these records. Upon receiving these records, the data aggregation server converts the format of the received records into a format compatible with the personalization/segmentation database (step 610). In the described embodiment, the records are converted (step 612) into a text file that is compatible with the text file format created at step 606.

Periodically, or with manual intervention, the text files that were created at steps 606 and 612 are converted into database records and entered into the personalization/segmentation database. When this operation occurs upon the expiration of a timeout period (step 614), all existing text files are consolidated and compressed by the data aggregation server (step 616). These compressed files are then exported to the personalization/segmentation database (step 618) where they are uncompressed and converted into database records. In the described embodiment, a C Program is used to decompress all of the text files and to convert the text files into a database format. The personalization/segmentation database then enters the records for future use.

Consolidation of records may also be initiated manually (step 620). When manual consolidation is initiated, the text files are consolidated and compressed (step 622) and then exported to the personalization/segmentation database (step 624). The personalization/segmentation database then decompresses the file and converts the records into a compatible database format.

Figure 7:
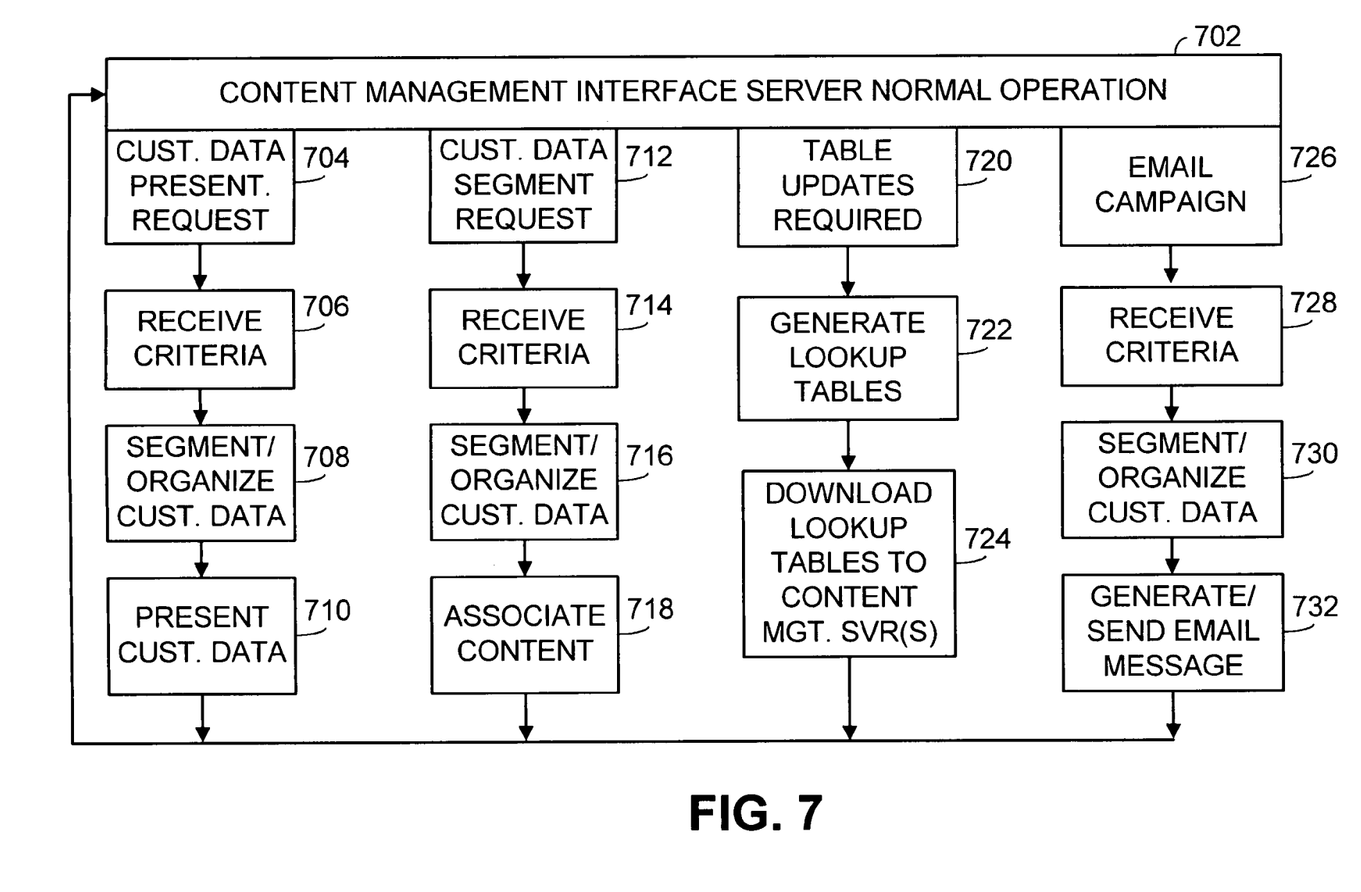
FIG. 7 is a logic diagram illustrating operation of a content management interface server according to the present invention.

FIG. 7 is a logic diagram illustrating operation of a content management interface server according to the present invention. When a client interfaces with the content management interface server, the client may review the customer activity that has been recorded regarding the client's web site. Operation is initiated with a customer data presentation request made by a client (step 704). Data is presented to the client according to a set of criteria that is set up by the client. Examples of criteria that may be used to present the data include, purchasers vs. non-purchasers, number of purchases, total dollars spent, number of times visited the client site, how the customer reached the site and a number of other criteria. Various summary pages may also be produced which aid the client in attempting to create categories of behavior for its customer base and/or to view all customer data for a particular time period.

The content management interface server then receives the criteria (step 706) and segments the customer data according to the criteria (step 708). The customer data is then presented to the client based upon these criteria and organized according to the set of criteria (step 710).

After a review of the data has revealed particular ways in which the customer should segment customers and how to target personalized content or other content to the customers, the client performs a customer data segmentation request (step 712). The content management interface server receives the criteria for the customer data segmentation request (step 714) and segments/organizes the customer data according to the particular criteria. At the same time, the client provides personalized content corresponding to the customer segmentation. The content management interface server then associates the personalized content with the particular segmentations created (step 718).

Based upon a current segmentation of customer data and associated personalized content, the content management server determines that table (or other logic function) updates are required (step 720). Table updates are performed periodically, e.g., every six hours at a time that is coordinated with the receipt of new data in the personalization/segmentation database from the data aggregation server. Alternately, a table update may be initiated manually, such as is the case when segmentation criteria are updated. When table updates are required, the content management interface server retrieves all pertinent data from the personalization/segmentation database, retrieves the segmentation criteria and generates lookup tables, e.g., hash tables, based upon the data and the segmentation criteria (step 722). These tables are then downloaded to the content management server(s) that is/are servicing the particular client and expID (step 724).

As another operation according to the present invention, the content management interface server creates and generates an email campaign (step 726). This email campaign may be periodically initiated for the client or may be manually initiated by the client. When initiated, the content management server receives criteria for the email campaign (step 728), e.g., particular segments of customers to which the email is directed. The content management interface server then segments/organizes the customer data to retrieve customer entries that correspond to the criteria (step 730). The content management interface server then generates email messages to the customers meeting the segmentation criteria (step 732). The email messages created may have embedded code in the email messages to track the email as well as the subsequent behavior of the recipient, e.g., click through to the client web site and an ultimate purchase. Email addresses may be collected by the PCDC during operations when the customer orders from the corresponding client. In an alternate operation, the job of creating and sending the email is contracted out to a third party.

Figure 8:
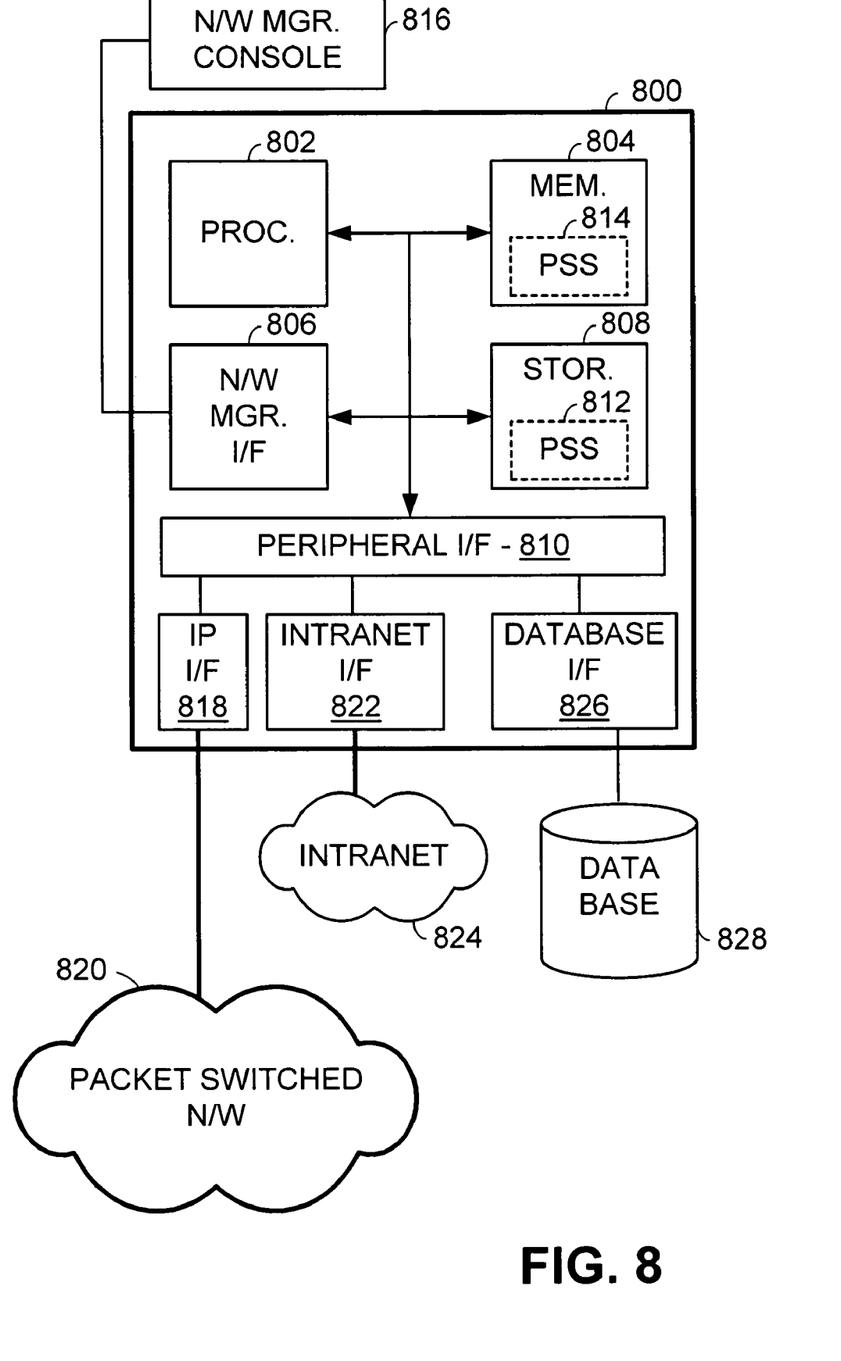
FIG. 8 is a block diagram illustrating a server computer constructed according to the present invention.

FIG. 8 is a block diagram illustrating a server computer constructed according to the present invention that may perform the functions of the content management server 108, the data aggregation server 112 or the content management interface server 116. The server computer 800 may be a general-purpose computer that has been programmed and/or otherwise modified to perform the particular operations described herein. However, the server computer 800 may be specially constructed to perform the operations described herein. The server computer 800 may also provide the functionality of the content server 110, the client web server(s) 104 and/or the third party web server(s) 106.

The server computer 800 includes a processor 802, memory 804, a network manager interface 806, storage 808 and a peripheral interface 810, all of which couple via a processor bus. The processor 802 may be a microprocessor or another type of processor that executes software instructions to accomplish programmed functions. The memory 804 may include DRAM, SRAM, ROM, PROM, EPROM, EEPROM or another type of memory in which digital information may be stored. The storage 808 may be magnetic disk storage, magnetic tape storage, optical storage, or any other type of device, which is capable of storing digital instructions and data.

The network manager interface 806 couples to a network manager console 816, which allows a manager to interface with the server computer 800. The network manager console 816 may be a keypad/mouse/display or may be a more complex device, such as a personal computer, which allows the manager to interface with the server computer 800.

The peripheral interface 810 couples to a packet switched network interface 818, an Intranet interface 822 and a database interface 826. The packet switched network interface couples the server computer 800 to a packet switched network 820 that may be the Internet (WWW) or another packet switched network. The Intranet interface 822 couples the server computer 800 to an Intranet 824. In one embodiment, the server computer 800 couples to the Internet via the Intranet 824. The server computer 800 may use the Intranet 824 to access resources that are not coupled to the Internet.

The database interface 826 couples the server computer 800 to a database 828 (when included) which stores content and data relating to the personalization and segmentation functions according to the present invention. Personalization and Segmentation Software (PSS) 812 is loaded into the storage 808 of the server computer 800. Upon its execution, a portion of the PSS 812 is downloaded into memory 804 (as PSS 814). The processor 802 then executes the PSS 814 instructions to perform the operations described herein. The programming and operation of digital computers is generally known to perform such steps. Thus, only the functions performed by the server computer 800 will be described and not the manner in which the processor 802 and the other components of the server computer 800 function to perform these operations.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A system for providing personalized content to an e-commerce customer at a customer computer, the system comprising:
    a web page stored on a client web server and that is downloadable to the customer computer, the web page comprising:
        at least one image to be displayed on the customer computer; and personalized content delivery code to be executed by the customer computer that causes the customer computer to:
  retrieve an identity of the e-commerce customer if saved on the customer computer;
  create an identity of the e-commerce customer if the identity of the e-commerce customer is not saved on the customer computer;
  retrieve a session ID if saved on the customer computer;
  create a session ID if the session ID is not saved on the customer computer or if the session ID that is saved on the customer computer is expired; and
  send a query to a content management server that includes the identity of the client, the identity of the e-commerce customer, and the session ID;
a content management server that receives the query from a customer computer via a data network;
the content management server identifying personalized content to be displayed to the e-commerce customer on the customer computer, wherein the personalized content is identified based upon the identity of the client and the identity of the e-commerce customer; and
the content management server returning a response to the customer computer via the data network that identifies the personalized content.

2. The system of claim 1, wherein:
the query also includes a secondary identifier that relates to the client; and
the content management server also uses the secondary identifier to identify the personalized content.

3. The system of claim 1, wherein the identity of the personalized content corresponds to an image to be displayed to the e-commerce customer on the customer computer.

4. The system of claim 1, wherein the identity of the personalized content corresponds to an executable file to be executed by the customer computer.

5. The system of claim 1, wherein the content management server identifies the personalized content via a table lookup operation in which the identity of the e-commerce customer serves as an index.

6. The system of claim 1, further comprising a data aggregation server that receives e-commerce customer information corresponding to the query from the content management server, the e-commerce customer information including the identity of the client, the identity of the e-commerce customer and the identity of the personalized content.

7. The system of claim 6, further comprising a personalization/segmentation database coupled to the data aggregation server, the personalization/segmentation database storing e-commerce customer information for a plurality of e-commerce customers.

8. The system of claim 7, further comprising:
a content management interface server coupled to the personalization/segmentation database and to the content management server;
wherein the content management interface server supports the association of personalized content to segments of e-commerce customers;
wherein the content management interface server creates an association of personalized content with the segments of e-commerce customers; and
wherein the content management interface server downloads the association of personalized content with the segments of e-commerce customers to the content management server.

9. The system of claim 1, wherein:
the content management server comprises a plurality of separate server computers, each of which services a particular set of queries; and
the system further comprises a load balancing server coupled to the plurality of separate server computers and to the data network, wherein the load balancing server routes queries to the plurality of separate server computers.

10. A method for providing personalized content to an e-commerce customer, the method comprising:
receiving a query from a customer computer via a data network, the query including the identity of a client, the identity of the e-commerce customer, and a session ID, the query produced by personalized content delivery code executed by the customer computer that caused the customer computer to:
  retrieve an identity of the e-commerce customer if saved on the customer computer;
  create an identity of the e-commerce customer if the identity of the e-commerce customer is not saved on the customer computer;
  retrieve a session ID if saved on the customer computer;
  create a session ID if the session ID is not saved on the customer computer or if the session ID that is saved on the customer computer is expired; and
  send the query to a content management server that includes the identity of the client, the identity of the e-commerce customer, and the session ID;
identifying personalized content to be displayed to the e-commerce customer on the customer computer, wherein the personalized content has been identified based upon the identity of the client, the identity of the e-commerce customer, and the session ID; and
returning a response to the customer computer via the data network that identifies the personalized content.

11. The method of claim 10, wherein:
the query also includes a secondary identifier that relates to the client; and
the secondary identifier is also used to identify the personalized content.

12. The method of claim 10, wherein the identity of the personalized content corresponds to an image to be displayed to the e-commerce customer on the customer computer.

13. The method of claim 10, wherein the identity of the personalized content corresponds to an executable file to be executed by the customer computer.

14. The method of claim 10, wherein identifying the personalized content includes performing a lookup operation with which the identity of the e-commerce customer serves as an index.

15. The method of claim 10, further comprising:
generating an e-commerce customer record based upon the query, the e-commerce customer record including the identity of the client, the identity of the e-commerce customer and the identity of the personalized content; and
storing the e-commerce customer information for future reference.

16. The method of claim 15, further comprising:
  segmenting the e-commerce customers into a plurality of segments; and
  associating particular personalized content with each of the plurality of segments of e-commerce customers.

17. A downloadable web page stored on a client web server, the downloadable web page comprising:
  at least one image to be displayed on a customer computer of an e-commerce customer; and
  personalized content delivery code to be executed by the customer computer that causes the customer computer to:
  retrieve an identity of the e-commerce customer if saved on the customer computer;
  create an identity of the e-commerce customer if the identity of the e-commerce customer is not saved on the customer computer;
  retrieve a session ID if saved on the customer computer;
  create a session ID if the session ID is not saved on the customer computer or if the session ID that is saved on the customer computer is expired; and
  send a query to a content management server that includes the identity of the client, the identity of the e-commerce customer, and the session ID.

18. The downloadable web page of claim 17, wherein, upon execution, the personalized content delivery code further causes the customer computer:
  receive a response from the content management server that includes the address of personalized content;
  retrieve the personalized content; and
  present the personalized content on the customer computer.

19. The downloadable web page of claim 17, wherein the personalized content comprises an image to be displayed to the e-commerce customer on the customer computer.

20. The downloadable web page of claim 17, wherein the personalized content comprises an executable file to be executed by the customer computer.

21. A content management server that supports personalized content delivery, the content management server comprising:
  a processor;
  memory coupled to the processor;
  a user interface coupled to the processor;
  a network interface coupled to the processor that supports data transmission with a coupled data network; and
  the memory storing executable code that comprises:
    a plurality of instructions that, upon execution by the processor, cause the content management server to receive a query from a customer computer via the data network, the query including the identity of a client, the identity of the e-commerce customer, and a session ID, the query produced by personalized content delivery code executed by the customer computer that caused the customer computer to:
      retrieve an identity of the e-commerce customer if saved on the customer computer;
      create an identity of the e-commerce customer if the identity of the e-commerce customer is not saved on the customer computer;
      retrieve a session ID if saved on the customer computer;
      create a session ID if the session ID is not saved on the customer computer or if the session ID that is saved on the customer computer is expired; and
      send the query to a content management server that includes the identity of the client, the identity of the e-commerce customer, and the session ID;
    a plurality of instructions that, upon execution by the processor, cause the content management server to identify personalized content to be displayed to an e-commerce customer on the customer computer, wherein the personalized content has been identified based upon the identity of the client, the identity of the e-commerce customer, and the session ID; and
    a plurality of instructions that, upon execution by the processor, cause the content management server to return a response to the customer computer via the data network that identifies the personalized content.

22. The content management server of claim 21, wherein:
  the query also includes a secondary identifier that relates to the client; and
  the secondary identifier is also used to identify the personalized content.

23. The content management server of claim 21, wherein the personalized content comprises an image to be displayed to the e-commerce customer on the customer computer.

24. The content management server of claim 21, wherein the personalized content comprises an executable file to be executed by the customer computer.

25. The content management server of claim 21, wherein the executable code further comprises:
  a plurality of instructions that, upon execution by the processor, cause the content management server to generate an e-commerce customer record based upon the query, the e-commerce customer record including the identity of the client, the identity of the e-commerce customer and the identity of the personalized content; and
  a plurality of instructions that, upon execution by the processor, cause the content management server to store the e-commerce customer record for future reference.

26. A computer readable medium that stores executable code that, when executed by a server computer, causes the server computer to provide personalized content to an e-commerce customer, the executable code comprising:
  a plurality of instructions that, upon execution by the server computer, cause the server computer to receive a query from a customer computer via a data network, the query including the identity of a client, the identity of the e-commerce customer, and a session ID, the query produced by personalized content delivery code executed by the customer computer that caused the customer computer to:
    retrieve an identity of the e-commerce customer if saved on the customer computer;
    create an identity of the e-commerce customer if the identity of the e-commerce customer is not saved on the customer computer;
    retrieve a session ID if saved on the customer computer;
    create a session ID if the session ID is not saved on the customer computer or if the session ID that is saved on the customer computer is expired; and
    send the query to a content management server that includes the identity of the client, the identity of the e-commerce customer, and the session ID;

a plurality of instructions that, upon execution by the server computer, cause the server computer to identify personalized content to be displayed to an e-commerce customer on the customer computer, wherein the personalized content is identified based upon the identity of the client, the identity of the e-commerce customer, and the session ID; and a plurality of instructions that, upon execution by the server computer, cause the server computer to return a response to the customer computer via the data network that identifies the personalized content.

27. The computer readable medium of claim 26, wherein:

the query also includes a secondary identifier that relates to the client; and the secondary identifier is also used to identify the personalized content.

28. The computer readable medium of claim 26, wherein the personalized content comprises an image to be displayed to the e-commerce customer on the customer computer.

29. The computer readable medium of claim 26, wherein the personalized content comprises an executable file to be executed by the customer computer.

30. The computer readable medium of claim 26, wherein the plurality of software instructions further comprise:

a plurality of instructions that, upon execution by the server computer, cause the server computer to generate an e-commerce customer record based upon the query, the e-commerce customer record including the identity of the client, the identity of the e-commerce customer and the identity of the content; and a plurality of instructions that, upon execution by the server computer, cause the server computer to store the e-commerce customer record for future reference.

31. The computer readable medium of claim 30, wherein the plurality of software instructions further comprise:

a plurality of instructions that, upon execution by the server computer, cause the server computer to segment the e-commerce customers into a plurality of segments;

a plurality of instructions that, upon execution by the server computer, cause the server computer to associate particular personalized content with each of the plurality of segments of e-commerce customers; and a plurality of instructions that, upon execution by the server computer, cause the server computer to generate the tables with which the table lookup operations are performed based upon the plurality of segments of e-commerce customers and the associated personalized content.

32. The system of claim 1, wherein the session ID is deemed expired when it is no longer relevant to current browsing activity of the customer computer.

33. The method of claim 10, wherein the session ID is deemed expired when it is no longer relevant to current browsing activity of the customer computer.

34. The downloadable web page of claim 17, wherein the session ID is deemed expired when it is no longer relevant to current browsing activity of the customer computer.

35. The content management server of claim 21, wherein the session ID is deemed expired when it is no longer relevant to current browsing activity of the customer computer.

36. The computer readable medium of claim 26, wherein the session ID is deemed expired when it is no longer relevant to current browsing activity of the customer computer.

* * * * *